Figure 1:
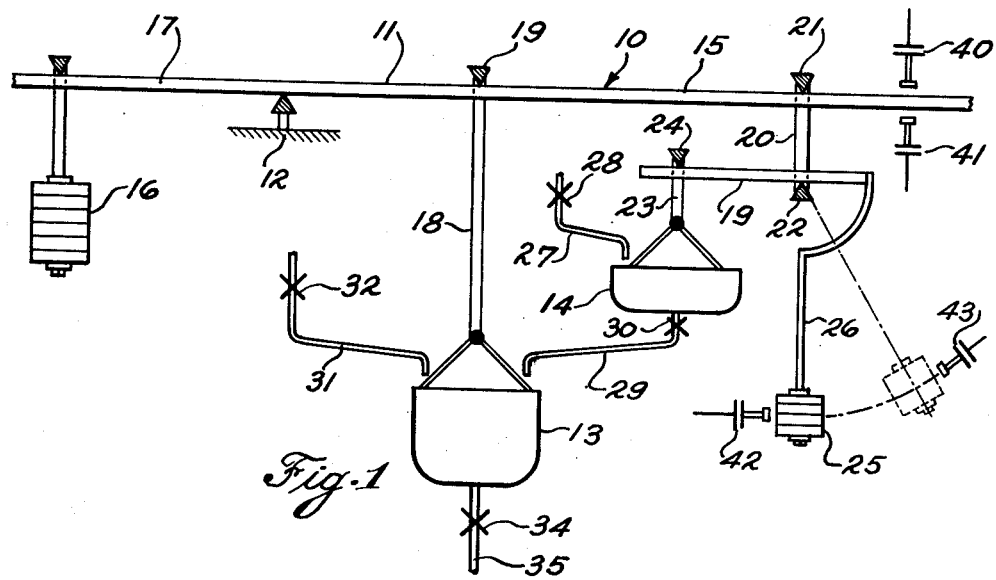

May 25, 1954 — L. E. MYLTING — 2,679,374

BATCH MIXING METHOD AND APPARATUS

Filed Sept. 22, 1953

INVENTOR.
LAURITZ EMIL MYLTING

BY RICHEY, WATTS, EDGERTON & McNENNY

*Frederic B. Schramm*

ATTORNEYS

Patented May 25, 1954

2,679,374

UNITED STATES PATENT OFFICE 2,679,374

BATCH MIXING METHOD AND APPARATUS

Lauritz E. Mylting, Ardmore, Pa., assignor to The Allen-Sherman-Hoff Company, Philadelphia, Pa., a corporation of Pennsylvania Application September 22, 1953, Serial No. 381,715

17 Claims. (Cl. 249—14)

This invention relates to a method of and means for mixing two substances in desired proportions and, more particularly, to such a method and apparatus for intermittently adding small amounts of one substance to another substance which is delivered at a random variable rate so as to produce uniformly proportioned batches of the mixed substances.

An object of the invention is to combine two substances in any desired proportions to form successive batches of uniform mixture.

An object of the invention is to provide a means for combining two substances in desired proportions which may be utilized with equal facility to combine substances whether liquid or solid.

Another object of the invention is to provide an electrical control apparatus for batch mixing apparatus which is simple and yet provides precise control of mixing operations.

Still another object of the invention is to combine a first substance which may be delivered at any arbitrary rate with a second substance so as to produce a uniform mixture.

A further object of the invention is to combine two substances in any desired proportions and to maintain the proportions of the mixture substantially uniform although one of the substances is delivered at a nonuniform or random variable rate.

There is described in my U. S. Patent No. 2,594,975, dated April 29, 1952, and entitled "Mixing Apparatus," a method of and means for combining dust or ashes with water or other liquid in predetermined proportions. The apparatus of the invention is particularly useful in disposing of fly ash or dust produced by large industrial furnace installations.

The present invention constitutes a mixing apparatus which may be employed to accomplish the result of the aforementioned patent but accomplishes that result in a novel manner and without the limitations affected by the mode of operation of the apparatus of that patent. In particular, the method and the apparatus of the present invention is adapted for combining two substances whether they be in solid or liquid form. Additionally, the proportioning of the substances is accomplished in a unique and definite manner which is unaffected by the numerous varying circumstances encountered in industrial operations.

The apparatus of the invention includes two balancing or scale beams, the first or main beam serving to balance the weight of a mixture held in a mixing vat and a predetermined quantity of a first one of the substances to be mixed against a fixed weight. The second balancing or scale beam is supported by the first beam at a position such that a holding pan for the first one of the substances which is suspended from the second beam has a greater effective lever arm than the mixing vat. The novel method of the invention involves the repeated transfer of quantities of the one substance which is held by the holding pan to the mixing vat whenever a sufficient quantity of the remaining substance is added to the mixing vat to unbalance the main scale beam. Since the given quantities of the first substance operate upon the main scale beam with a shorter lever arm when in the mixing vat than when in the holding pan, the main scale beam is repeatedly balanced to maintain a uniform proportion of the two substances as they are mixed. The novel apparatus of the invention comprises also a novel electric circuit which includes a number of contacts that are opened and closed by the scale beam as they move into and from their respective balance positions. A stepping relay is operated by the contacts to control the movement of the substances to and from the mixing vat and holding pan in their proper sequence.

It is a feature of the invention that the mixing of the two substances is accomplished whatever the rate of delivery of the substances to the mixing apparatus.

It is a feature of the invention that the proportioning of the mixture is independent of power failure or other conditions which may cause the mixing apparatus to stop operating.

Figure 2:
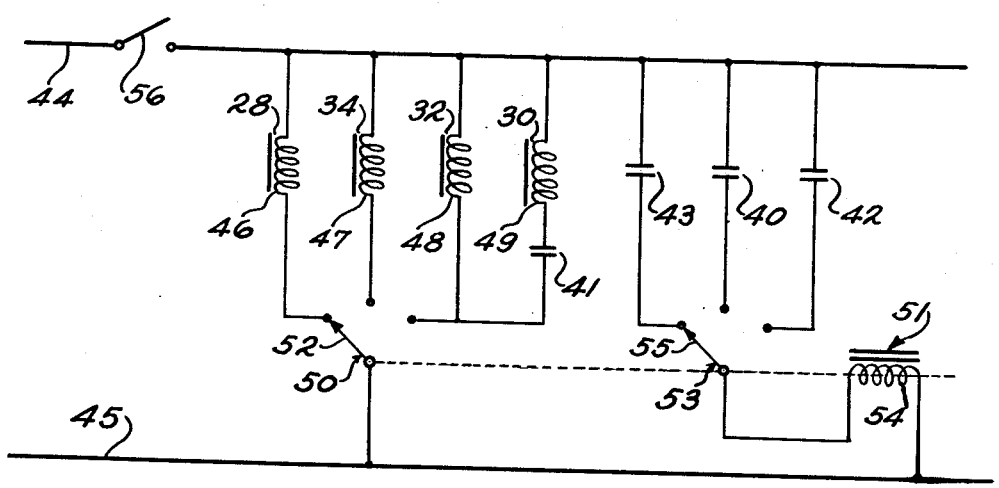

Other objects, features and advantages will become apparent from a consideration of the following detailed specification taken in connection with the accompanying drawings, in which:

Fig. 1 is a schematic representation of the weighing apparatus of the invention and the electrical contacts and valves associated therewith; and Fig. 2 is a schematic representation of the electrical circuit of the invention.

Referring now to Fig. 1, there is shown a schematic representation of the mixing apparatus of the invention which incorporates weighing apparatus 10 corresponding in certain general respects to the weighing apparatus of the patent referred to above. The weighing apparatus 10 comprises a main scale beam 11 which is balanced upon and supported by a pivot 12. The scale beam 11 supports a mixing vat 13 and a holding pan 14 on the one arm 15 thereof and a balancing weight 16 on the remaining arm 17 thereof. The balancing weight 16 serves to balance the mixing vat 13 and the holding pan 14 when predetermined quantities of material are held therein as will be explained below.

The mixing vat 13 is suspended from the scale beam 11 by any suitable means represented as a link 18 and a pivot 19. The mixing vat 13 is adapted to receive the two substances which are to be mixed and has associated therewith suitable stirring and mixing apparatus such, for example, as that illustrated in the afore-mentioned patent.

The holding pan 14 is adapted to receive and hold a predetermined quantity of one of the substances which are to be delivered to the mixing vat 13 and is supported from the scale beam 11 by suitable apparatus including a second scale beam 19, a pivot link 20 having an upper pivot 21 resting upon the beam arm 15 and a lower pivot 22 supporting the second scale beam 19. The holding pan 14 is supported upon one arm of the beam 19 by means of a link 23 and an upper pivot 24 and is counterbalanced by a weight 25 which is rigidly connected to the beam 19 by an arm 26. The weight 25 acts as a balancing pendulum for the holding pan 14 and is in a slightly inclined position with respect to the pivot 22 when the holding pan 14 is in balance.

Suitable means are provided for delivering the substances to be mixed to the holding pan 14 and to the mixing vat 13 and for removing the mixture from the mixing vat 13 in suitable batches and at predetermined intervals. To this end, a conduit or suitable conveying means 27 is provided for feeding a first one of the substances to the holding pan 14. An electrically controlled feeder valve 28 feeds the first substance to the conduit to allow the substance to flow into the holding pan 14 when the feeder valve is energized. Similarly, a conduit 29 and an electrically controlled feeder valve 30 control the feed or transfer of the substance held by the holding pan 14 to the mixing vat 13. A third conduit 31 and an associated electrically controlled feeder valve 32 control the feed of the remaining substance to the mixing vat 13. A delivery conduit 35 and a feeder valve 34 are provided for releasing the mixture from the mixing vat in predetermined batches.

The representation of the conduits, e. g. 27, 29, 31 and 33, and the valves 28, 30, 32 and 34 is purely symbolic, it being intended only to represent some conveying means which need function only to convey the substances to the mixing vat and the mixed substances from the mixing vat. The valves may, of course, be any suitable devices for interrupting the flow of the materials and which incorporate mechanical solenoids for operation by the electric circuit to be described below.

The electric circuit means associated with the weighing apparatus 10 illustrated in Fig. 1 includes two normally open contacts 40 and 41 associated with the main scale beam 11 and adapted to be opened and closed by that beam as it moves to and from a balanced position and two normally open contacts 42 and 43 which are associated with and actuated by the weight 25 as the second scale beam 19 moves to maintain a balanced position. The contacts 40, 41, 42 and 43 are connected in an electric circuit arrangement illustrated in Fig. 2 for operating the various valves 28, 30, 32 and 34 in the necessary sequence and at the necessary intervals.

The electric circuit of the invention includes two power lines 44 and 45 which may be connected to any suitable power supply. A number of solenoid coils 46, 47, 48 and 49, which are associated with and form a part of the valves 28, 34, 32 and 30 respectively, are connected to the power lines and to one of the contacts of a first rotary sequence switch 50 of a stepping relay 51. The switch arm 52 is connected to the power line 45 and the solenoid coils 46, 47 and 48 are energized only when the switch arm 52 engages the switch contact to which the particular coil is connected. The solenoid coil 49, which has the contacts 41 connected in series therewith for reasons which will be subsequently explained, is energized only when the contacts 41 are closed by the scale beam 11.

The contacts 43, 40 and 42 are connected to the successive contacts of a second rotary sequence switch 53 of the stepping relay 51 and serve to control the energization of a solenoid 54 of the relay. The relay 51 is of the type which advances the arms of the relay through one step upon each energization of the relay solenoid. The relay 51 is also of a three-step variety, e. g. as the arm 55 is stepped through a sequence to successively connect the contacts 43, 40 and 42 in series with the solenoid 54, the next succeeding actuation of the relay will cause the arm 55 to return to the contact associated with contacts 43.

The operation of the apparatus of the invention may best be described with reference to its normal mode of operation, e. g. after the apparatus has been started in operation. To start the apparatus, it is necessary only to fill the holding pan 14 with a predetermined maximum amount of a first one of the substances to be mixed, while the mixing vat 13 is filled to a predetermined level with a properly proportioned mixture of the two substances which are to be mixed. The weight 16 is then adjusted so that the scale beam 11 is in balance and so that contacts 40 and 41 are open.

Operation of the apparatus is initiated by adjusting the stepping relay so that the arms 52 and 55 are in the third position, e. g. so that solenoid 48 is energized. With solenoid 48 energized, valve 32 is opened and the substance which is delivered by the conduit 31 is fed to the mixing vat 13. The vat 13 thereupon increases in weight and the main scale beam 11 gradually moves into an unbalanced condition with the arm 15 displaced below the horizontal balance position.

When the arm 51 has been moved downward a sufficient amount, the contacts 41 are closed, thereby energizing the solenoid 49 associated with the valve 30. Valve 30 is opened and a quantity of the first substance is transferred from the holding pan 14 to the mixing vat 13. It will be seen that, since the holding pan 14 is suspended from the arm 15 of the main beam 11 by the pivot 21 so as to have a much greater lever arm than the mixing vat 13, any given amount of material which is transferred from the holding pan 14 to the mixing vat 13 will have a substantially lesser effect upon the balance of the scale beam in the latter position. Accordingly, after valve 30 is opened, quantities of the first one of the substances may move from the holding pan 14 to the mixing vat 13 until such time as the contacts 41 are opened and the solenoid 49 is deenergized to close the valve 30.

Although the main scale beam 11 has been brought into a balance position, the valve 32 remains open and quantities of the second one of the substances continue to be fed into the mixing vat 13. Accordingly, the scale beam 11 again moves downward into an out-of-balance condition to close contacts 41 and the entire process described above is repeated. Each closure of contacts 41 adds a sufficient increment of the first substance to the mixed substances contained in the mixing vat 13 to restore the scale beam to a balanced position. The portions of the two substances in the mixture are, therefore, repeatedly brought to the proper proportions by weight, regardless of the manner or rate at which the second substance is fed into the mixing vat 13 from the conduit 31.

As the holding pan 14 is emptied of the substance held therein, e. g. as the weight of the holding pan and its contents reaches a predetermined minimum weight, the balance weight 25 moves downward and ultimately closes contacts 42. As contacts 42 close, the solenoid 54 of the relay 51 is energized and the switch arms 52 and 55 are advanced one step to energize the solenoid 46 associated with the valve 28 and to connect the contacts 43 in series with the solenoid 54. As the solenoid 46 is energized, the valve 28 is opened and quantities of the first one of the substances to be mixed are fed into the holding pan 14. This process continues until such time as the weight of the holding pan and its contents reaches a predetermined maximum whereupon the balancing weight 25 is displaced sufficiently to close the contacts 43.

Upon closure of the contacts 43, the solenoid 54 of the stepping relay 51 is energized and the switch arms 52 and 55 are advanced one step to energize the solenoid 47 associated with valve 34 and to connect the contacts 40 in series with the solenoid 54. Upon energization of the solenoid 47, the valve 34 is opened and the mixed substances flow from the mixing vat 13 and through the conduit 33. After a sufficient quantity of the mixture has been removed from the mixing vat 13, the scale beam 11 becomes sufficiently unbalanced in the upward direction to close the contacts 40. Upon closure of contacts 40, the solenoid 54 of the stepping relay 51 is energized and the arms 52 and 55 are advanced one step to energize the solenoid 48 and to connect contacts 42 in series with the solenoid 54. The valve 32 is thereupon opened to again feed the second one of the substances to the mixing vat and the entire process is repeated.

It will be apparent that the second one of the substances, e. g. the one fed through the conduit 31, may be fed to the mixing vat 13 at any desired constant or variable rate. For example, in the application of the invention to dust removal as in the patent referred to, the boiler ash may be fed to the mixing vat 13 through the conduit 31 and the water will be supplied to the mixing vat from the holding pan 14 whatever the manner of delivery of the ash from the boilers.

The operation of the electrical circuits is such that the apparatus may be stopped at any time or at any step of the process either arbitrary or through power failure or the like without affecting the succeeding sequence of steps. A switch 56 is provided for initiating the mixing operation when the arms 52 and 55 of the stepping relay are set in the third contact position.

The invention has been described with exemplary reference to the mixing of dust and ashes, but it is intended and the apparatus of the invention is capable of functioning to mix any types of substances whatsoever. Thus, the apparatus may be utilized to mix two solids, a solid and a liquid, or two liquids in desired proportions. The apparatus may also be utilized under proper circumstances to mix gases or combinations of gases with liquids or solids. Additionally, while the invention has been described as embodied in a mechanical weighing arrangement, the practice of the invention is by no means limited thereto.

It is to be understood that the foregoing is not intended to be restrictive or confining and that various rearrangements of parts and modifications of design may be resorted to without departing from the scope or spirit of the invention as herein claimed.

What is claimed is:

1. The method of combining two substances in desired proportions which comprises forming an initial mixture of substances in the desired proportions, utilizing the weight of the initial mixture and the weight of a predetermined quantity of one of the substances to establish a balanced condition, substantially continuously adding quantities of the remaining substance to the mixture to disturb the balanced condition, and intermittently transferring sufficient quantities of the first-named substance to the mixture to restore the balanced condition upon each transfer.

2. The method of combining two substances in desired proportions which comprises forming an initial mixture of substances in the desired proportions, utilizing the weight of the initial mixture and the weight of a predetermined quantity of a first one of the substances to establish a balanced condition, substantially continuously adding quantities of the remaining substance to the mixture to disturb the balanced condition and intermittently transferring sufficient quantities of the first one of the substances to restore the balanced condition upon each transfer, continuing the process until the initial quantity of the first one of the substances is exhausted and and then removing a portion of the mixture.

3. The method of combining two substances in desired proportions which comprises forming an initial mixture of substances in the desired proportions, utilizing the weight of the initial mixture and the weight of a predetermined quantity of a first one of the substances to establish a balanced condition, substantially continuously adding quantities of the remaining substance to the mixture to disturb the balanced condition and intermittently transferring sufficient quantities of the first one of the substances to the mixture to restore the balanced condition upon each transfer, continuing the process until the initial quantity of the first one of the substances is exhausted and then removing a portion of the mixture, again measuring a predetermined quantity of the first one of the substances and repeating the process.

4. The method of combining two substances in desired proportions which comprises forming an initial mixture of the substances in the desired proportions, utilizing the weight of the initial mixture and the weight of a predetermined quantity of one of the substances to establish a balanced condition, the effect of the weight of the one substance upon the balanced condition being some multiple of the weight of the mixture upon the balanced condition, substantially continuously adding predetermined quantities of the remaining substance to the mixture to disturb the balanced condition, intermittently transferring predetermined quantities of the first-named substance to the mixture to reestablish the balanced condition and repeating the transfer until the initial quantity of the first substance is exhausted.

5. The method of producing successive batches of aggregate, each batch being composed of two different substances in predetermined proportions which comprises the steps of utilizing a predetermined quantity of a mixture, incorporating the two substances and a predetermined quantity of the first one of the substances separate therefrom to balance a fixed weight, continuously adding quantities of the remaining one of the substances to upset the balance in one direction, restoring the balance by transferring a sufficient amount of the first substance to the mixed substance, and continuing to add more of the second substance to again upset the balance and then again restoring the balance by transferring a quantity of the first substance to the mixed substance and repeating the process until the quantity of the first substance is exhausted, separating a sufficient quantity of the mixed substance to form a batch of aggregate and utilizing a sufficient amount of the first substance to rebalance the fixed weight with the remaining mixed substance and then repeating the process.

6. The method of producing successive batches of aggregate, each batch being composed of two different substances in predetermined proportions, which comprises the steps of utilizing a predetermined quantity of a mixture, incorporating the two substances and a predetermined quantity of the first one of the substances separate therefrom to balance a fixed weight, continuously adding quantities of the remaining one of the substances to offset the balance in one direction, repeatedly transferring sufficient amounts of the first substance to the mixture to restore the balance upon each transfer, and continuing to so transfer the first substance until the predetermined quantity of the first substance is exhausted, separating a sufficient quantity of the mixed substance to form a batch of aggregate, and adding a sufficient amount of the first substance to rebalance the fixed weight with the remaining mixed substance, and then repeating the process.

7. The method of producing successive batches of aggregate, each batch being composed of two different substances in predetermined proportions, which comprises the steps of utilizing a predetermined quantity of a mixture, incorporating the two substances and a predetermined quantity of the first one of the substances separate therefrom to balance a fixed weight, continuously adding quantities of the remaining one of the substances to offset the balance in one direction, transferring a sufficient amount of the first substance to the mixture to restore the balance, continuing to add more of the second substance to again upset the balance and then again transferring a quantity of the first substance to the mixture to again restore the balance, and repeating the process until the quantity of the first substance is exhausted, separating a sufficient quantity of the mixed substance to form a batch of aggregate, and adding a sufficient amount of the first substance to rebalance the fixed weight with the remaining mixed substance, and then repeating the process.

8. Apparatus for mixing two substances which comprises in combination a mixing vat, a holding pan and means for balancing the mixing vat and the holding pan to establish a balanced condition when the mixing vat has a predetermined amount of a mixture of the two substances contained therein and the holding pan has a predetermined amount of a first one of the substances contained therein, the said balancing means including a second balancing means for the holding pan, means for feeding a first one of the substances to be mixed to the holding pan including a first electrically operated feeder valve, means for transferring the first one of the substances from the holding pan to the mixing vat including a second electrically operated feeder valve, means for feeding the second substance to the mixing vat including a third electrically operated feeder valve, means operated by the balancing means as the combined weight of the mixing vat and the holding pan increases or decreases from the balance weight, and means operated by the second balancing means as the weight of the holding pan increases or decreases from the balance weight thereof, and electric circuit means operatively connected to the said operating means for successively opening the third valve to feed the second substance to the mixing vat, repeatedly opening the second valve to repeatedly bring the main scale beam into a balanced condition, and opening the first device to deliver a predetermined quantity of the first substance to the holding pan.

9. Apparatus for mixing two substances which comprises in combination a mixing vat, a holding pan and means for balancing the mixing vat and the holding pan to establish a balanced condition when the mixing vat has a predetermined amount of a mixture of the two substances contained therein and the holding pan has a predetermined amount of a first one of the substances contained therein, the said balancing means including a second balancing means for the holding pan and the second balancing means operating upon the first balancing means with a proportionately greater effect than the mixing vat, means for feeding a first one of the substances to be mixed to the holding pan including a first electrically operated feeder valve, means for transferring the first one of the substances from the holding pan to the mixing vat including a second electrically operated feeder valve, means for feeding the second substance to the mixing vat including a third electrically operated feeder valve, means operated by the balancing means as the combined weight of the mixing vat and the holding pan increases or decreases from the balance weight, and means operated by the second balancing means as the weight of the holding pan increases or decreases from the balance weight thereof, and electric circuit means operatively connected to the said operating means for successively opening the third valve to feed the second substance to the mixing vat in response to a predetermined decrease in the weight of the mixing vat, repeatedly opening the second valve to repeatedly bring the main scale beam into a balanced condition in response to predetermined increases in the combined weight of the mixing vat and the holding pan, and opening the first valve to deliver a predetermined quantity of the first substance to the holding pan in response to a predetermined decrease in the weight of the holding pan.

10. Apparatus for mixing two substances comprising in combination a mixing vat, a first scale beam and means for supporting the mixing vat on the scale beam, a holding pan, a second scale beam for the holding pan and means for supporting the second scale beam from the first scale beam and a balancing weight on the first scale beam for balancing both the mixing vat and the holding pan, means for feeding a first one of the substances to be mixed to the holding pan including a first solenoid operated valve, means for transferring the first one of the substances from the holding pan to the mixing vat including a second solenoid operated valve, means for feeding the second substance to the mixing vat including a third solenoid operated valve, and means for releasing the mixed substances from the mixing vat including a fourth solenoid operated valve, a set of normally open contacts at each side of each of the scale beams, each adapted to be closed when the associated scale beam moves to an out-of-balance position toward the contacts, and electric circuit means for successively opening the third valve to feed the second substance to the mixing vat, repeatedly opening the second valve to repeatedly bring the main scale beam into a balanced condition, opening the first valve to deliver a predetermined quantity of the first substance to the holding pan and opening the fourth valve to release a predetermined quantity of the mixture from the mixing vat, the said electric circuit means being operatively controlled by the successive closure of the said contacts as the scale beams move into and out-of-balance positions.

11. The invention in accordance with claim 10, the said electric circuit means comprising a stepping relay having two rotary sequence switches and an actuating solenoid and connections between the solenoids of the solenoid operated valves and the fixed contacts of a first one of the sequence switches and between the scale beam contacts and the fixed contacts of the second one of the sequence switches and between the switch arm of the second sequence switch and the relay solenoid, whereby the stepping relay is actuated to terminate one operation and initiate succeeding operations upon closure of the scale beam contacts to which the switch arm of the sequence switches is positioned.

12. The invention in accordance with claim 11, the said electric circuit means having a lower contact associated with the main scale beam connected in series with the solenoid of the second valve and the aforesaid series connected contact and solenoid connected in parallel with the solenoid of the third valve for repeatedly balancing the main scale beam by adding increments of the first one of the substances to the mixing vat as the addition of the second substance to the mixing vat displaces the main scale beam toward an unbalanced condition.

13. Apparatus for adding a first substance which is delivered at a more or less uniform rate to produce a relatively uniform mixture which comprises in combination a mixing vat for holding the mixture, a first scale beam and a pivot therefor, and means for supporting the mixing vat on the scale beam at one side of the pivot, a holding pan for holding a predetermined amount of the first substance and means for supporting the holding pan on the scale beam beyond the mixing vat, from the pivot, the said holding pan support means including a second scale beam having the pivot therefor supported on the first beam and including a balancing weight for balancing the holding pan when the predetermined amount of the first substance is held therein, means on the first scale beam for balancing the mixing vat and the holding pan and their contents, means for transferring the first substance from the holding pan to the mixing vat including a first electrically operated feeder valve, means for feeding quantities of the second substance to the mixing vat including a second electrically operated feeder valve, means connected to the first electrically operated feeder valve for repeatedly transferring quantities of the first substance from the holding pan to the mixing vat to balance the first scale beam upon each transfer and comprising a first set of contacts operated by the first scale beam, and means connected to the second electrically operated feeder valve for interrupting the flow of the second substance to the mixing vat when the predetermined quantity of the first substance in the holding pan is exhausted and comprising a set of contacts adapted to be closed by the second scale beam.

14. Apparatus for mixing two substances comprising in combination a mixing vat, a first scale beam and a pivot therefor, and means for supporting the mixing vat on the scale beam at one side of the pivot, a holding pan and means for supporting the holding pan on the scale beam beyond the mixing vat from the pivot, the said holding pan support means including a second scale beam having the pivot therefor supported on the first beam and including a balancing weight for balancing the holding pan, a weight on the first scale beam at the opposite side of the pivot from the mixing vat and the holding pan for balancing the mixing vat and the holding pan and their contents, means for feeding a first one of the two substances to the holding pan including a first valve, means for transferring the first substance from the holding pan to the mixing vat including a second valve, means for feeding a second one of the two substances into the mixing vat including a third valve, and means for removing the mixture from the mixing vat including a fourth valve, and means for successively operating the second valve to transfer a quantity of the first substance from the holding pan to the mixing vat in response to an unbalanced condition of the beam produced by the continuous addition of a second substance to the mixing vat.

15. Apparatus for mixing two substances comprising in combination a mixing vat, a first scale beam and a pivot therefor, and means for supporting the mixing vat on the scale beam at one side of the pivot, a holding pan and means for supporting the holding pan on the scale beam beyond the mixing vat from the pivot, the said holding pan support means including a second scale beam having the pivot therefor supported on the first beam and including a balancing weight for balancing the holding pan, a weight on the first scale beam at the opposite side of the pivot from the mixing vat and the holding pan for balancing the mixing vat and the holding pan and their contents, means for feeding a first one of the two substances into the holding pan including a first valve, means for transferring the first substance from the holding pan to the mixing vat including a second valve, means for feeding a second one of the two substances into the mixing vat including a third valve, and means for removing the mixture from the mixing vat including a fourth valve, and electric circuit means for operating the said valves to perform the successive steps of filling the holding vat, removing a portion of the mixture in the mixing vat and then delivering more of the second substance to the mixing vat while repeatedly admitting quantities of the material in the holding pan to the mixing vat to repeatedly balance the first scale beam until the holding pan is emptied.

16. The invention in accordance with claim 15, the said electric circuit means comprising solenoids for operating the valves, a plurality of sets of contacts associated with the said two beams and adapted to be opened and closed when the beams move in either direction from a balanced condition and a stepping relay connected to the said contacts and to the said solenoids for initiating a succeeding step upon the completion of a preceding step.

17. The invention in accordance with claim 15, the said electric circuit means, comprising solenoids for operating the valves, a plurality of sets of contacts associated with the said two beams, each beam being adapted to close a set of contacts when it moves in either direction from a balanced condition, and a stepping relay connected to the said contacts and to the said solenoids whereby the closing of one of the sets of contacts associated with the beams due to an unbalanced condition advances the stepping relay to terminate the preceding step and initiate the succeeding step.

References Cited in the file of this patent

UNITED STATES PATENTS

| Number | Name | Date |
|---|---|---|
| 808,599 | Crichfield | Dec. 26, 1905 |
| 1,334,395 | Patterson | Mar. 23, 1920 |
| 1,501,578 | Zepp | July 15, 1924 |
| 1,536,589 | Keen | May 5, 1925 |
| 1,704,268 | Venable | Mar. 5, 1929 |
| 1,969,533 | Pipes et al. | Aug. 7, 1934 |
| 1,978,558 | Van der Horst | Oct. 30, 1934 |
| 2,109,534 | Johnson | Mar. 1, 1938 |
| 2,398,643 | Jerome | Apr. 16, 1946 |
| 2,594,975 | Mytting | Apr. 29, 1952 |